(12) United States Patent
Sullivan

(10) Patent No.: US 9,816,481 B2
(45) Date of Patent: Nov. 14, 2017

(54) SYSTEM AND APPARATUS FOR GENERATING ELECTRICITY FROM MOTION OF FLUID

(71) Applicant: William Paul Sullivan, Almonte (CA)

(72) Inventor: William Paul Sullivan, Almonte (CA)

( * ) Notice: Subject to any disclaimer, the term of this patent is extended or adjusted under 35 U.S.C. 154(b) by 0 days.

(21) Appl. No.: 14/695,893

(22) Filed: Apr. 24, 2015

(65) Prior Publication Data

US 2015/0260150 A1    Sep. 17, 2015

Related U.S. Application Data

(63) Continuation of application No. PCT/CA2012/000984, filed on Oct. 26, 2012.

(51) Int. Cl.
*F03B 13/20* (2006.01)
*H02K 35/02* (2006.01)

(52) U.S. Cl.
CPC ............ *F03B 13/20* (2013.01); *H02K 35/02* (2013.01); *F05B 2220/7066* (2013.01); *Y02E 10/38* (2013.01)

(58) Field of Classification Search
CPC ......... F03B 13/16; F03B 13/20; H02K 35/02; H02K 41/06; H02K 44/14; Y02E 10/38
USPC ..................................................... 290/42, 53
See application file for complete search history.

(56) References Cited

U.S. PATENT DOCUMENTS

| | | | |
|---|---|---|---|
| 3,496,871 A * | 2/1970 | Stengel | F04B 17/00 310/12.12 |
| 3,674,634 A | 7/1972 | Watson | |
| 3,927,329 A * | 12/1975 | Fawcett | H02K 44/00 290/1 R |
| 4,114,046 A * | 9/1978 | Yousef | F03B 13/16 290/44 |

(Continued)

FOREIGN PATENT DOCUMENTS

| | | |
|---|---|---|
| GB | 2463129 A | 3/2010 |
| WO | WO2008/051446 A2 | 5/2008 |
| WO | WO-2012/138853 A2 | 10/2012 |

OTHER PUBLICATIONS

International Search Report and Written Opinion for PCT/CA2012/000984, dated Jul. 18, 2013, 8 pages.

(Continued)

*Primary Examiner* — Viet Nguyen
(74) *Attorney, Agent, or Firm* — Murray IP Consulting Inc.; Sean Murray

(57) ABSTRACT

A module for generating electricity from waves in a body of water is disclosed. The module comprises: a housing operable to float in the body of water; a tube formed into a circle integrated within the housing; a magnet element operable to move within the tube; and an electrically conductive coil surrounding substantially all of the tube. The housing is operable to be angularly displaced by waves within the body of water and the angular displacement of the housing is operable to cause movement of the magnet element within the tube surrounded by the coil. The movement of the (Continued)

magnet element through the tube surrounded by the coil generates a voltage on the coil through electromagnetic induction. The voltage on the coil can be rectified and subsequently stored, transmitted or utilized. In some implementations, a plurality of modules may be integrated together to form an array.

20 Claims, 16 Drawing Sheets

(56) References Cited

U.S. PATENT DOCUMENTS

| | | | |
|---|---|---|---|
| 4,231,711 A | 11/1980 | MacGregor | |
| 4,321,020 A * | 3/1982 | Mittal | 417/320 |
| 4,492,875 A | 1/1985 | Rowe | |
| 4,843,250 A * | 6/1989 | Stupakis | F03B 13/20 290/53 |
| 5,136,173 A | 8/1992 | Rynne | |
| 5,411,377 A | 5/1995 | Houser et al. | |
| 5,650,681 A * | 7/1997 | DeLerno | H02K 99/10 310/10 |
| 5,696,413 A | 12/1997 | Woodbridge et al. | |
| 5,986,349 A | 11/1999 | Eberle | |
| 6,921,983 B2 * | 7/2005 | Diamontopoulos | F03B 13/16 290/1 R |
| 7,141,888 B2 | 11/2006 | Sabol et al. | |
| 7,161,254 B1 * | 1/2007 | Janky | H02K 35/04 290/1 R |
| 7,279,803 B1 | 10/2007 | Bosley | |
| 7,288,860 B2 * | 10/2007 | Cheung | H02K 35/02 290/1 R |
| 7,425,770 B2 * | 9/2008 | Suzuki | 290/42 |
| 7,436,082 B2 | 10/2008 | Ruse et al. | |
| 7,554,215 B1 * | 6/2009 | Caragine | F03B 17/00 290/42 |
| 7,562,489 B2 | 7/2009 | Turner | |
| 7,786,609 B2 | 8/2010 | Houser et al. | |
| 8,274,184 B2 * | 9/2012 | Caddell | 310/14 |
| 8,536,724 B2 * | 9/2013 | Dullaway | F03B 13/1815 290/53 |
| 2003/0151258 A1 * | 8/2003 | Shin | 290/43 |
| 2005/0151375 A1 * | 7/2005 | Cheung | B60C 23/041 290/1 R |
| 2007/0228736 A1 | 10/2007 | Smushkovich | |
| 2008/0074079 A1 * | 3/2008 | Wong | H02J 7/32 320/114 |
| 2008/0224472 A1 * | 9/2008 | Bean | 290/42 |
| 2009/0230686 A1 * | 9/2009 | Catlin | F03B 13/264 290/54 |
| 2009/0256443 A1 * | 10/2009 | Turner | H02K 35/02 310/179 |
| 2010/0045046 A1 * | 2/2010 | Douglas | F03B 13/16 290/54 |
| 2010/0123313 A1 | 5/2010 | Hobdy | |
| 2010/0219709 A1 * | 9/2010 | Raghuprasad | H02J 7/32 310/156.01 |
| 2011/0084488 A1 | 4/2011 | Eder et al. | |
| 2011/0084502 A1 * | 4/2011 | Ghassemi | F03G 7/08 290/1 R |
| 2012/0102939 A1 | 5/2012 | Dunn et al. | |
| 2012/0235528 A1 * | 9/2012 | Axford | H02K 21/12 310/152 |

OTHER PUBLICATIONS

Renewable UK, Wave and Tidal Energy in the UK, State of the industry report, Mar. 2011, pp. 1-58.

* cited by examiner

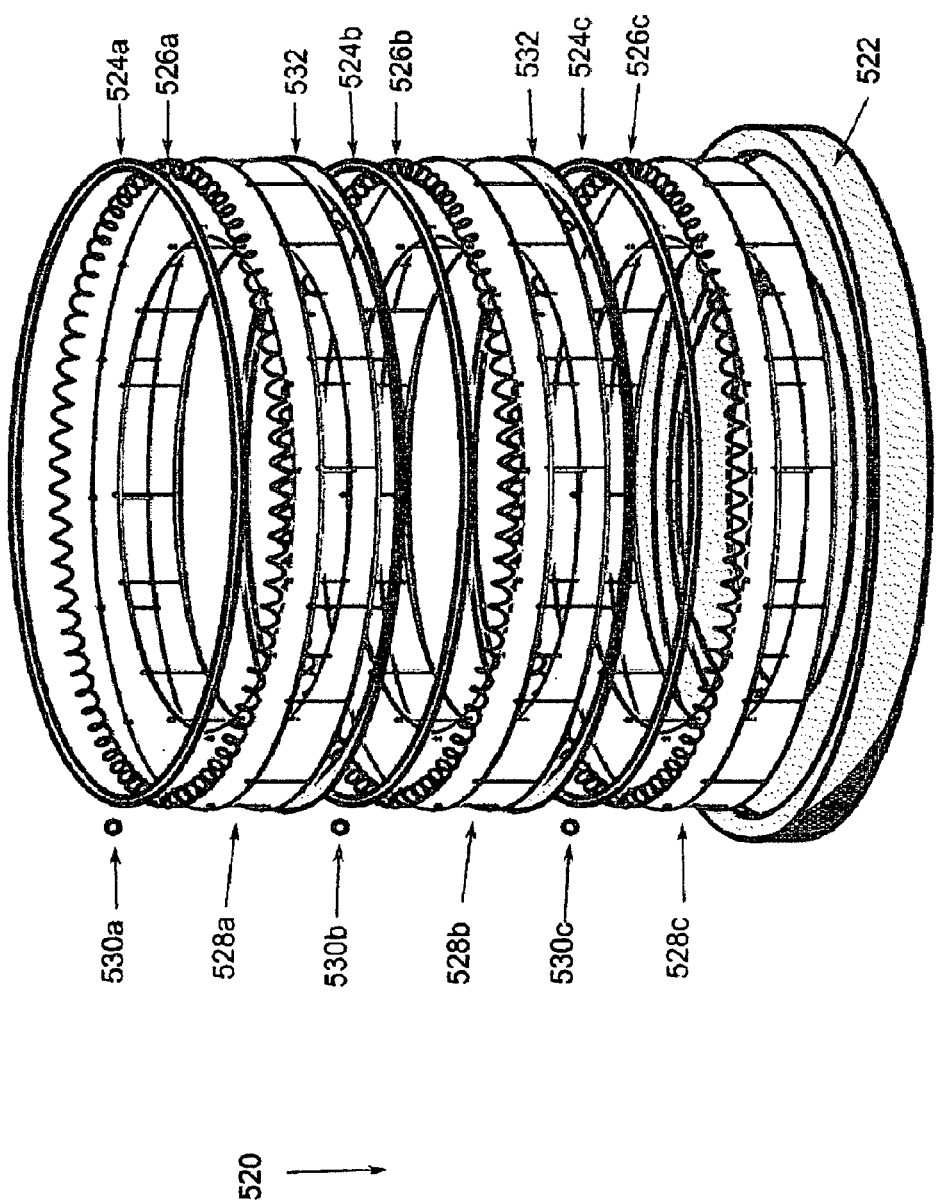

SYSTEM AND APPARATUS FOR GENERATING ELECTRICITY FROM MOTION OF FLUID

CROSS-REFERENCE TO RELATED APPLICATION

The present application claims the benefit as a continuation of PCT Patent Application Ser. No. PCT/CA2012/000984, filed on Oct. 26, 2012 entitled "SYSTEM AND APPARATUS FOR GENERATING ELECTRICITY FROM MOTION OF FLUID" by William Paul SULLIVAN, hereby incorporated by reference herein.

FIELD OF THE INVENTION

The invention relates generally to generating electricity and, more particularly, to system and apparatus for generating electricity from motion of fluid.

BACKGROUND

According to International Energy Agency data, from 1990 to 2008, the average energy usage per person increased by 10% while world population increased by 27%, resulting in a 39% increase in energy use worldwide. Growth in regional energy use over this period was especially high in emerging economies. Energy use in the Middle East increased by 170%, China by 146%, India by 91%, and Africa by 70%. In 2008, total worldwide energy consumption was 474 exajoules. ExxonMobil's 2012 "The Outlook for Energy: A View to 2040" states that global energy demand will be about 30% higher in 2040 compared to 2010, as economic output more than doubles and prosperity expands, with the need for energy to make electricity remaining the single biggest driver of demand.

In 2006, oil, coal and gas combined represented 88% of the world energy supply according to the National Energy Board of Canada. Both hydroelectric power and nuclear accounted for 6% each. Burning fossil fuels results in greenhouse gas emissions, which leads to climate change and an increase in extreme weather events. Combustion of fossil fuels also produces other air pollutants which contribute to smog and acid rain, which have adverse health impacts on humans as well as negative environmental impacts. Harvesting, processing, and distributing fossil fuels also create environmental concerns. Nuclear energy also has many unresolved environmental problems. Nuclear waste, power plant leaks, and catastrophic nuclear disasters are all negative consequences of nuclear power. The generation of hydroelectric power has environmental impacts as well. Hydroelectric dams and transmission lines have significant effects on water and biodiversity.

Currently, there are a number of alternative energy options in use or under development, but they make up a tiny proportion of world energy use due to the limitations currently associated with these technologies. Solar panels are currently very expensive to produce, and studies by the Electric Power Research Institute and elsewhere show that solar thermal technologies are far more expensive than coal. Though they emit no pollution while in use, there are environmental, health, and safety issues related to how they are manufactured, installed, and ultimately disposed of. The large amount of land required for utility-scale solar power plants poses an additional environmental problem. Solar power has limited performance—it works only during daylight hours, with peak production from 11 am to 1 pm on clear sunny days. There are also issues around site suitability, as solar panels require unobstructed, direct sunlight in a relatively cloud-free climate to operate at peak performance. Wind turbines also have high costs associated with construction and installation, though one of the biggest concerns associated with this form of energy is the potential impact on human health from Wind Turbine Syndrome caused by the low frequency noise emitted by the turbines. Bird and bat deaths as a result of collisions with the turbines is a major biological issue related to this form of alternative energy. Harnessing tidal energy is currently being explored as an alternative energy option, but tidal energy is only available twice a day which leads to low energy generation. Further, there is a high cost associated with the construction and installation of the large barrier dams necessary for energy capture, and there is a high environmental cost associated with harnessing this energy source as these dams restrict fish migration and cause silt build up which affects tidal basin ecosystems in negative ways.

There are many existing ideas for devices that extract energy from waves to provide electric power. To date none of these ideas has reached practical implementation. Existing ideas have proven to be uneconomical due either to high capital costs, or mechanical unreliability leading to short working life, or high maintenance costs. Most devices have two stages of conversion in which wave motion is converted to hydraulic or pneumatic power and then to electricity. Reliability problems can be traced to mechanical complexity of the devices in combination with the corrosive marine environment, or an inability to absorb higher than design wave conditions without damage to the mechanism.

A practical wave energy device would ideally feature low capital costs, minimal moving parts, high corrosion resistance, direct conversion from wave motion to electricity and a high tolerance for extreme wave conditions. Against this background, there is a need for solutions that will mitigate at least one of the above problems, particularly enabling the generation of electricity from motion of fluid such as ocean waves and river currents in an economical and/or efficient manner.

SUMMARY OF THE INVENTION

The present invention is directed to a module for generating electricity from waves in a body of water is disclosed. The module comprises: a housing operable to float on the body of water; a tube formed into a circle integrated within the housing; a magnet element operable to move within the tube; and an electrically conductive coil surrounding substantially all of the tube. The housing is operable to be angularly displaced by waves within the body of water and the angular displacement of the housing is operable to cause movement of the magnet element within the tube surrounded by the coil. The movement of the magnet element through the tube surrounded by the coil generates a voltage on the coil through electromagnetic induction. The voltage on the coil can be rectified and subsequently stored, transmitted or utilized. In some implementations, a plurality of modules may be integrated together to form an array.

According to a first broad aspect, the present invention is an apparatus for generating electricity comprising: a housing operable to float in a fluid; a tube within the housing; a magnet element operable to move within the tube; and an electrically conductive coil surrounding at least a portion of the tube; whereby movement of the magnet element within the tube in response to movement of the fluid generates a voltage on the coil through electromagnetic induction.

In various embodiments, the tube is circular and the magnet element is operable to move clockwise or counterclockwise through the tube depending upon the movement of the fluid. The coil may comprise a plurality of wraps comprising copper wire and the wraps may substantially surround all of the tube. The apparatus may further comprise a voltage rectifier coupled to the coil, the voltage rectifier operable to rectify the voltage on the coil and output a substantially DC current. The magnet element may comprise a spherical element.

In other embodiments, the magnet element may comprise a cylindrical magnet operable to move within the tube without substantially changing the direction of its polarization. In this case, the polarization of the cylindrical magnet may be substantially perpendicular to wraps of the coil. Further, the cylindrical magnet may comprise a cap on each end, each of the caps comprising one or more wheels that aid in the movement of the cylindrical element through the tube. In yet another embodiments, the magnet element may comprise a magnet core and one or more guide elements and the tube may comprise guide grooves corresponding to the guide elements that enable the magnet core to move within the tube without substantially changing the direction of its polarization. In this case, the polarization of the magnet core may be substantially perpendicular to wraps of the coil.

In various implementations, the housing may be operable to be angularly displaced in response to movement of the fluid and the magnet element may be operable to move within the tube in response to the housing being angularly displaced. The fluid may be a body of water and the housing may be operable to be angularly displaced by waves within the body of water.

According to a second broad aspect, the present invention is a system comprising a plurality of apparatus according to the first broad aspect. In this case, the apparatus are integrated together within an array and each of the apparatus are operable to move independently in response to movement of the fluid. Within each apparatus, movement of the magnet element within its corresponding tube in response to movement of the fluid generates a voltage on its corresponding coil through electromagnetic induction. Each of the apparatuses may further comprise a voltage rectifier coupled to its corresponding coil, each of the voltage rectifiers operable to rectify the voltage on its corresponding coil and output a substantially DC current. The outputs from the voltage rectifiers within the plurality of apparatuses may be coupled together.

According to a third broad aspect, the present invention is an apparatus for generating electricity from waves in a body of water comprising: a housing operable to float in the body of water; a tube formed into a circle integrated within the housing; a magnet element operable to move within the tube; and an electrically conductive coil surrounding substantially all of the tube. The housing is operable to be angularly displaced by waves within the body of water and the angular displacement of the housing is operable to cause movement of the magnet element within the tube surrounded by the coil. Movement of the magnet element through the tube surrounded by the coil generates a voltage on the coil through electromagnetic induction.

According to a fourth broad aspect, the present invention is a method of generating electricity from waves in a body of water. The method comprises: enabling floatation of an apparatus in the body of water, the apparatus comprising a circular tube surrounded at least partially by an electrically conductive coil; and enabling movement of a magnet element within the circular tube in response to waves in the body of water. Movement of the magnet element within the tube surrounded by the coil generates a voltage on the coil through electromagnetic induction.

These and other aspects of the invention will become apparent to those of ordinary skill in the art upon review of the following description of certain embodiments of the invention in conjunction with the accompanying drawings.

BRIEF DESCRIPTION OF THE DRAWINGS

A detailed description of embodiments of the invention is provided herein below, by way of example only, with reference to the accompanying drawings, in which:

FIG. 5B is a breakout view of a module for generating electricity according to an alternative embodiment of the present invention in which a series of vertically displaced coils are implemented;

It is to be expressly understood that the description and drawings are only for the purpose of illustration of certain embodiments of the invention and are an aid for understanding. They are not intended to be a definition of the limits of the invention.

DETAILED DESCRIPTION OF EMBODIMENTS

The present invention is directed to system and apparatus for generating electricity from movement of fluid, such as from surface wave displacement in bodies of water. Modules according to embodiments of the present invention are buoyant in water and can be displaced at various angles as a result of shifting movement of water through natural wave activity or other motion. In particular implementations, the modules may comprise a circular tube surrounded by a coil made of a conductive material such as copper and a magnet element free to move within the tube and therefore through the coil. As the module is displaced on various angles or otherwise physically moved, the magnet element can move within the tube, generating an electrical voltage on the coil through electromagnetic induction as the magnet element passes through the coil. With the shifting movement of surface waves, the module's center of balance is repeatedly shifted, resulting in the magnet element traveling within the circular tube and hence through the coil, potentially with significant momentum. The movement of the magnet element through the coil continues to provide an electrical voltage on the coil through electromagnetic induction. A voltage rectifier coupled to the coil can be used to output a DC current for storage and/or usage.

Figure 1A:
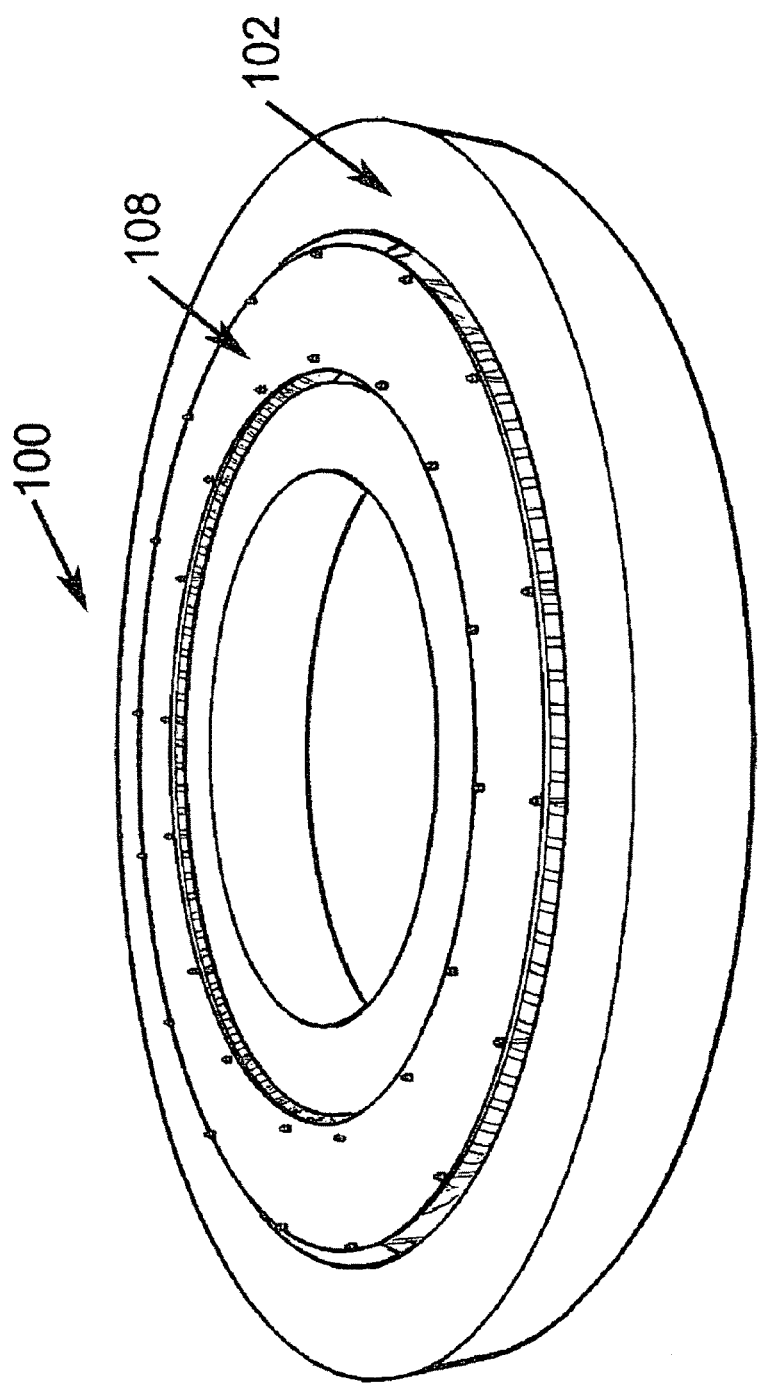
FIGS. 1A and 1B are a perspective view and a breakout view of a module for generating electricity according to an embodiment of the present invention.
Figure 1B:
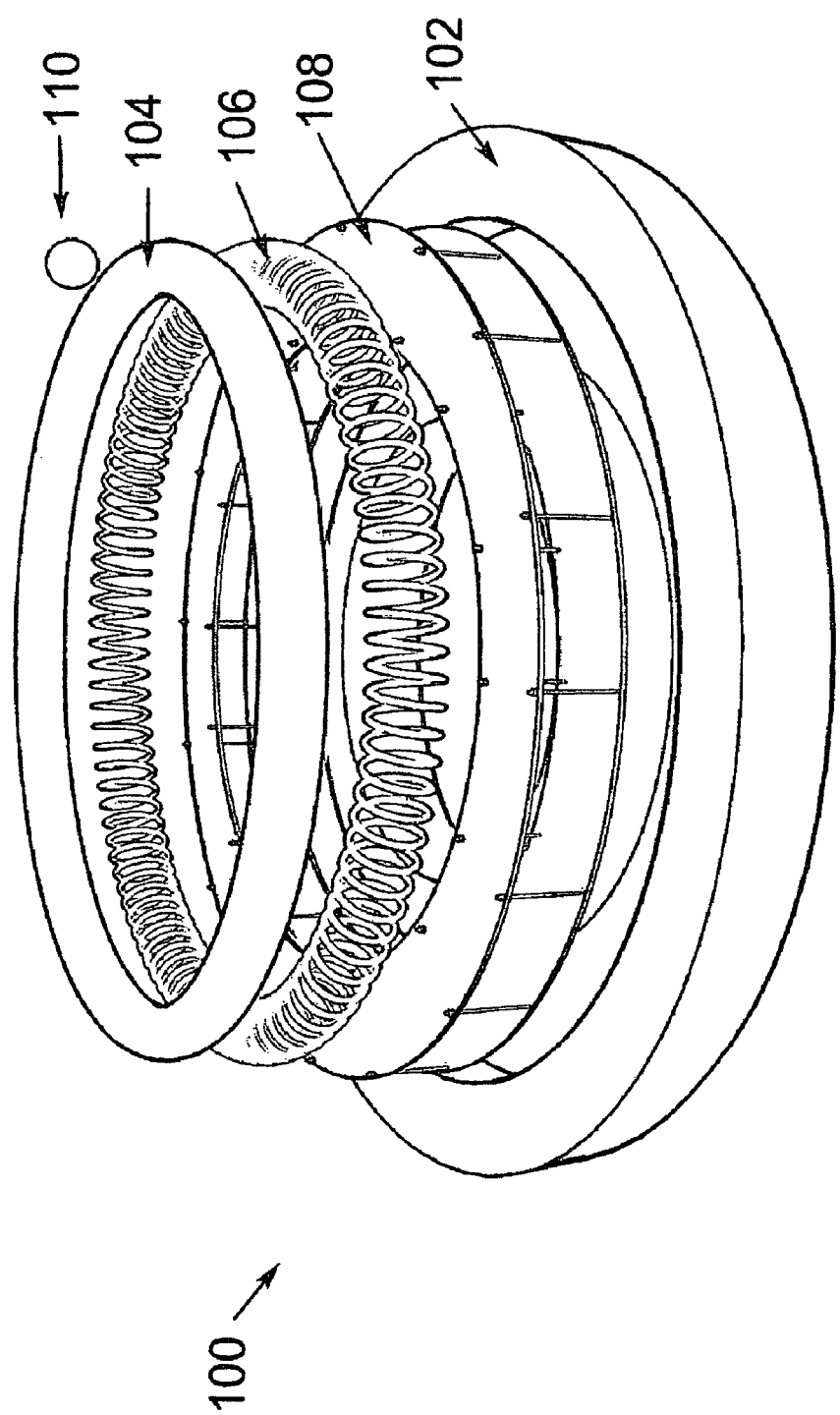

FIG. 1A is a perspective view of an electricity generation module 100 according to an embodiment of the present invention and FIG. 1B is a breakout view of the module 100. As shown, the module 100 comprises: a buoyancy ring 102, a circular tube 104 integrated within the ring 102, a coil 106 that surrounds the tube 104 and is made of a conductive material such as copper, and a tube housing 108 that protects the tube 104 and coil 106 while securing these elements to the buoyancy ring 102. Further, the module 100 comprises a magnetic element 110 that is operable to traverse the circular tube 104.

The buoyancy ring 102 may take many forms that allow for the module 100 to float in water or another fluid as required. In one embodiment, the ring 102 may comprise a molded plastic encasement that encompasses the entire module 100, potentially providing buoyancy and water protection so that water is prevented from interfering with the operation of the module and/or prevented from degrading the components in the module 100. In another embodiment, the buoyancy ring may comprise a form defined ring made of a buoyant material such as a foam ring. It should be understood that, to float in a fluid, the module 100 may float on the surface of the fluid, be semi-submerged in the fluid or be completely submerged within the fluid while maintaining some buoyancy in the fluid.

The tube 104 in various embodiments may comprise a plastic tube shaped into a circle, though in alternative embodiments the tube may comprise alternative materials and potentially even other shapes as will described. The tube 104 operates to provide a path for the magnetic element 110 through the coil 106. In one embodiment, the magnetic element 110 is a spherical magnet and the diameter of the inside of the tube is slightly larger than the diameter of the magnet, thus allowing for movement of the magnetic element through the tube 104. To reduce friction between the magnetic element 110 and the tube 104, the tube 104 may be smooth on the inside and may be lubricated with various lubricants such as oils.

The coil 106 may comprise copper wire wrapped around the tube 104. As depicted in FIG. 1B, the coil 106 in one implementation may have a set of wraps with a diameter similar to the diameter of the tube 104 with a small distance between the wraps. In different cases, the coil 106 may be implemented with various widths of copper wire, number of wraps, distances between wraps, diameters of the wraps and conductive material. In operation, the coil 106 receives an electrical voltage through electromagnetic induction as the magnet element passes through the tube 104 and therefore through the coil 106.

As shown in FIG. 1B, the tube housing 108 in one implementation may comprise two flat circular donut elements connected together by a series of spacer elements. In other embodiments, the tube housing 108 may take on various other forms to protect the tube 104 and coil 106. In some embodiments, the tube housing 108 may be integrated with the buoyancy ring 102 or the tube housing 108 may be omitted and the buoyancy ring 102 may act to protect the tube 104 and coil 106. The tube housing 108 may be made of many materials including wood or plastic. In particular embodiments, the tube housing 108 is designed to be low weight while at the same time sufficiently tough to protect the tube 104 and coil 106 and of a non-conductive material.

The magnet element 110 may comprise a spherical element with a diameter similar but slightly smaller than the diameter of the tube 104. The magnet element 110 of FIG. 1B comprises a rare earth magnet with north and south polarization at different sides of the spherical element. When installed within the tube 104, the magnet element 110 is operable to move through the tube freely as a result of gravity and subsequently due to momentum as the module changes in angular displacement. In some embodiments, a lubricant may be added to the inside of the tube 104 in order to reduce friction between the magnet element 110 and the internal wall of the tube 104, thus increasing the movement of the magnet element 110. The magnet element 110 may take many alternative forms, some of which will be described with reference to FIGS. 6A-6D and 7A-7B.

Figure 2A:
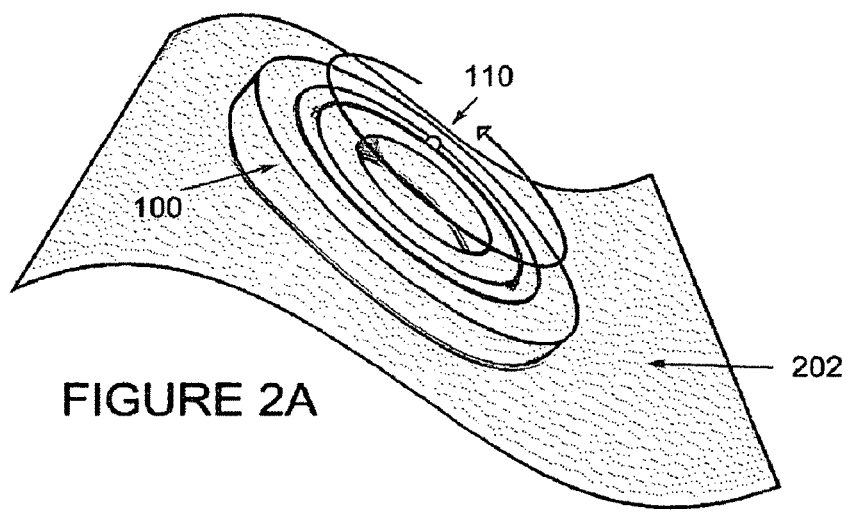
FIGS. 2A, 2B and 2C are illustrations of the module of FIGS. 1A and 1B in various operational states caused by surface wave displacement.
Figure 2B:
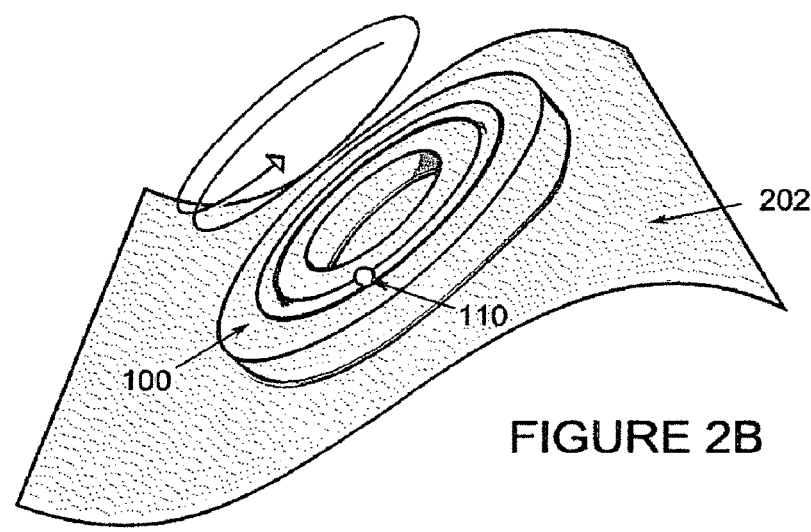
Figure 2C:
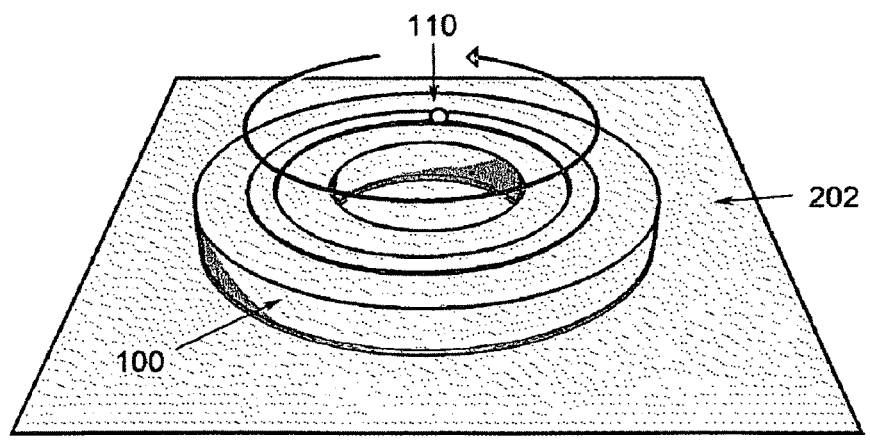

FIGS. 2A, 2B and 2C are illustrations of the module of FIGS. 1A and 1B in various operational states caused by surface wave displacement. In these illustrations, the module 100 is shown floating on a surface of water 202 and being displaced by waves. These illustrations may depict typical displacements of the module 100 in a case where the module 100 is floating in a body of water which has rolling waves. As shown in FIG. 2A, the module 100 has been displaced to an angle approximately 45 degrees down to the right. In this illustration, the magnet element 110 is shown rolling due to gravity towards the lower portion of the tube within the module 100, which in this case is the right side. Due to momentum, the magnet element 110 may pass the lowest point of the tube 104 and continue rolling through the tube 104, in this case in a counter clockwise direction.

As shown in FIG. 2B, as the wave on the surface of the water 202 shifts, the module 100 may subsequently be displaced to an angle approximately 45 degrees down to the left. This shifts the location of the low point in the tube 104 and therefore shifts how gravity acts on the magnet element 110. As shown, in the example of FIG. 2B, the magnet element 110 continues to traverse the tube 104 in a counter clockwise rotation, gaining momentum as it rolls towards the new low point in the tube 104 on the left side of the module 100. As before, the magnet element 110 continues to move through the tube 104 past the low point due to momentum. FIG. 2C illustrates a scenario in which the surface of the water 202 levels out flat and the module is flat, if only for a short period of time. In this case, the magnet element 110 is not pulled by gravity to a particular location within the tube 104 but may still move through the tube 104 due to momentum from previous displacements of the module 100.

Although depicted as travelling through the tube 104 in a counter clockwise direction, it should be understood that the magnet element 110 could traverse the tube 104 in either direction and, in fact, may shift directions often as a result of changes in displacement of the module 100. Further, although FIGS. 2A, 2B and 2C illustrate three sample displacements for the module 100, it should be understood that the module 100 may be displaced in many random manners due to waves or other changes in the surface of a liquid that the module is floating on.

The movement of the magnet element 110 through the tube 104 results in the magnet element going through the coil 106, which in turn generates voltage on the coil 106 through electromagnetic induction. Generally, the more movement of the magnet element 110 within the tube 104, the more voltage is generated on the coil 106. The amount of movement of the magnet element 110 can be affected by numerous different factors. In many cases, increased displacement of the module 100 from waves in terms of severity of angles and frequency of displacement can directly result in more movement of the magnet element 110 and therefore more voltage being generated on the coil 106. Many additional factors may affect the movement of the magnet element 110 and the generation of the voltage on the coil 106.

Figure 3A:
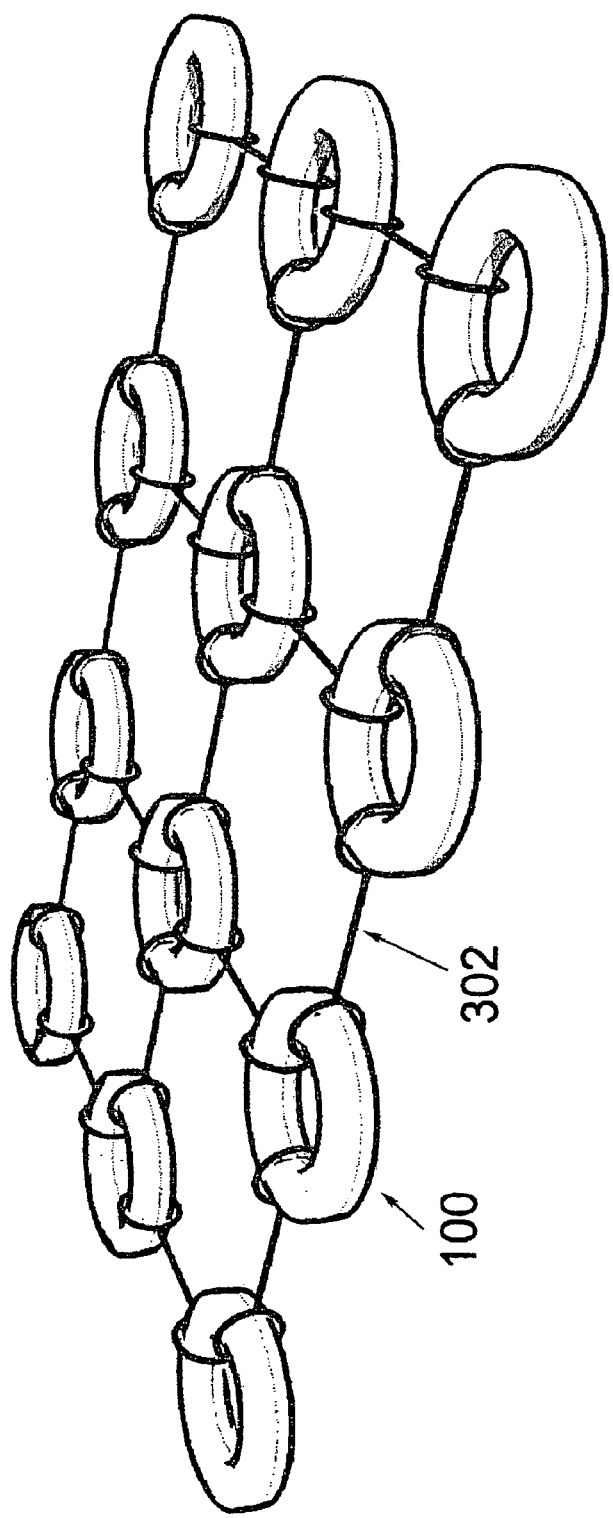
FIG. 3A is a perspective view of a plurality of modules according to FIGS. 1A and 1B interconnected into an array according to an embodiment of the present invention.

FIG. 3A is a perspective view of a plurality of modules according to FIGS. 1A and 1B interconnected into an array according to an embodiment of the present invention. As shown, the array of FIG. 3A comprises twelve modules 100 interconnected by interconnection elements 302. Each module 100 may generate a limited amount of electricity through electromagnetic induction as described with reference to FIGS. 1A and 1B. By combining a plurality of the modules 100 into an array, the electricity generated from the modules may be combined and stored, used or transmitted for various purposes. Further, the combination of modules 100 may be scalable based on space available in a body of water, the required amount of electricity desired and/or the budget for capital expenditures.

Figure 3B:
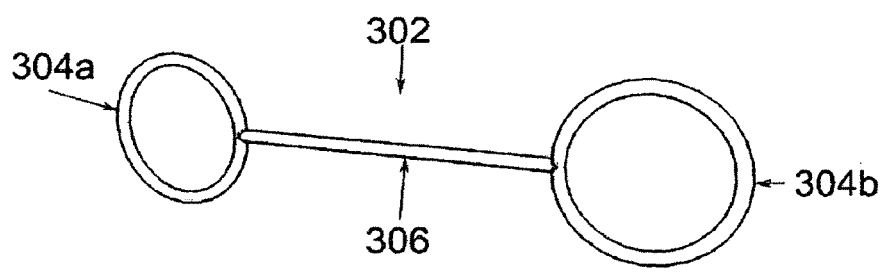
FIG. 3B is a view of an interconnection element that may be used to interconnect modules into an array.

FIG. 3B is a view of the interconnection element 302 that may be used to interconnect modules 100 into an array. As shown, the interconnection element 302, in one implementation, comprises first and second rings 304a, 304b respectively connected together by an interconnection rod 306. With this implementation, each of the rings 304a, 304b may connect to a different module 100 using a latch or other connection element and each module may independently be displaced by movement on the surface of a body of water that the array floats. It should be understood that numerous other designs could be used to interconnect modules 100 together into an array and still allow each module 100 to be displaced. For instance, in some embodiments, the modules 100 may be interconnected using rope, netting, cables or other non-rigid elements.

Figure 3C:
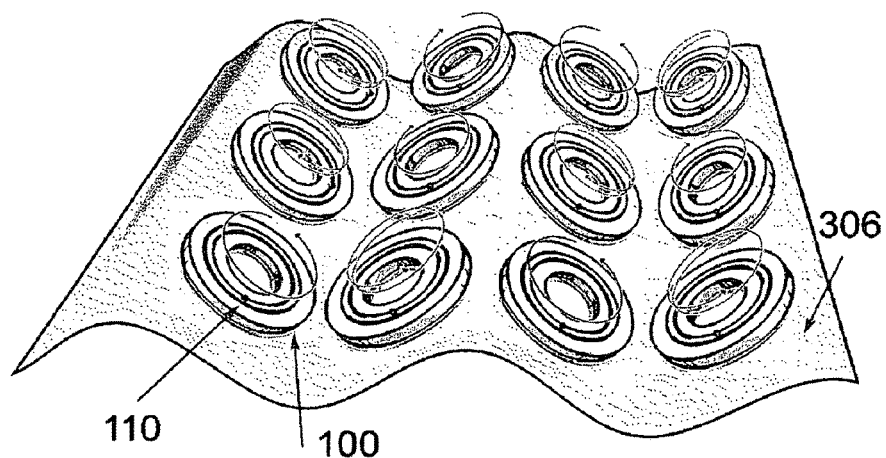
FIG. 3C is an illustration of the array of modules of FIG. 3A in a sample operational state caused by surface wave displacement.

FIG. 3C is an illustration of the array of modules 100 of FIG. 3A in a sample operational state caused by surface wave displacement. As shown in this sample case, each of the modules 100 may be independently displaced in various different angular directions. Within each module 100, the magnet element 110 may be moving through the corresponding tube 104 and hence the corresponding coil 106, thus generating voltage on the coil through electromagnetic induction. The amount of electricity generated in each module 100 may be different due to different displacements and different amounts of movement of the magnet elements, but each of the modules 100 could generate electricity. The electricity generated within the modules 100 of the array of FIG. 3C may be combined together using various methods.

Figure 4A:
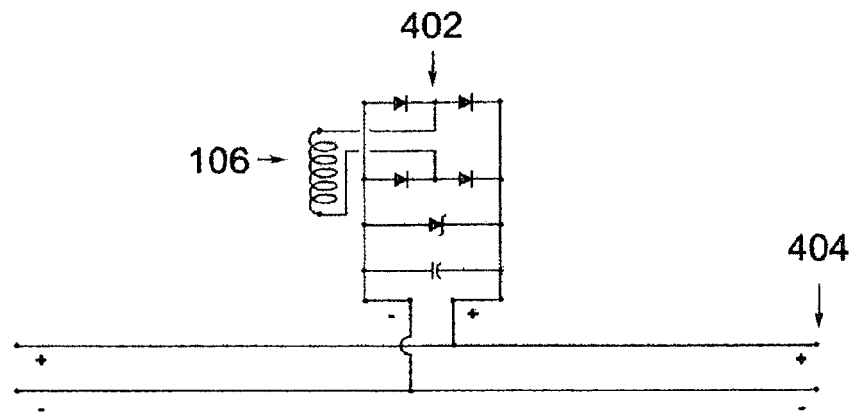
FIGS. 4A and 4B are example electrical circuits that may be implemented within the module of FIG. 1A and the array of FIG. 3A respectively according to implementations of the present invention.

FIG. 4A is an example electrical circuit that may be implemented within the module of FIGS. 1A and 1B according to an implementation of the present invention. As shown, the coil 106 may be coupled to a voltage rectifier 402 operable to rectify the voltage being generated on the coil 106. The voltage rectifier 402 may comprise four diodes, such as OA91 germanium diodes, connected through a parallel combination of a zener diode, such as a 5.1 volt zener diode, and a capacitor. Alternatively, the voltage rectifier 402 may comprise numerous other configurations as one skilled in the art would contemplate to generate a DC voltage from a fluctuating voltage source. The voltage rectifier 402 is coupled to positive/negative voltage lines 404 and can output a DC current to the lines 404 as voltage is generated on the coil 106.

Figure 4B:
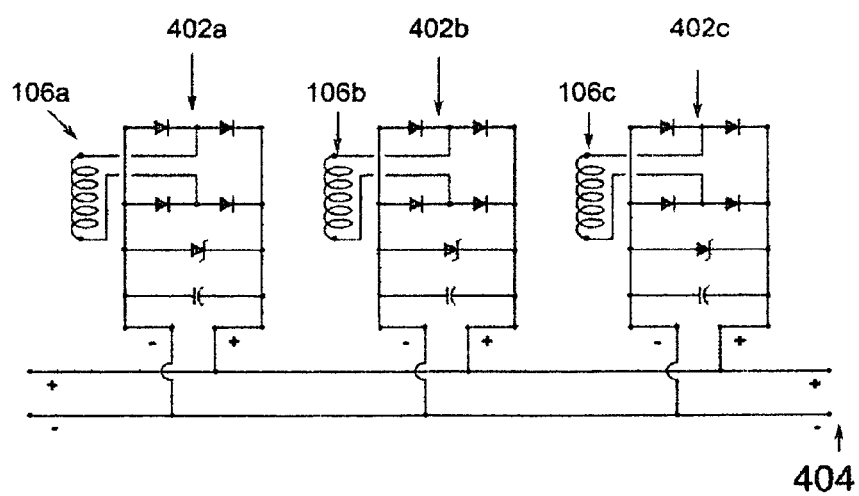

FIG. 4B is an example electrical circuit that may be implemented within the array of FIG. 3A according to an implementation of the present invention. In this embodiment, the electrical circuit comprises a plurality of circuits similar to that of FIG. 4A, one for each of the modules 100 within the array. As shown, there are three coils 106a, 106b, 106c each coupled respectively to a voltage rectifier 402a, 402b, 402c similar to that of FIG. 4A. Each of the voltage rectifiers 402a, 402b, 402c are coupled to the same positive/negative voltage lines 404. As voltage is generated on the coils 106a, 106b, 106c, the voltage rectifiers 402a, 402b, 402c rectify the voltage and apply DC current to the lines 404. The current from the various rectifiers is combined on the lines and the array of modules will generate a higher level of current on the lines 404 than any one of the modules could generate on its own. Although three coil/rectifier circuits are shown in FIG. 4B, it should be understood that there may be more or less circuits depending upon the number of modules within an array of modules.

Figure 4C:
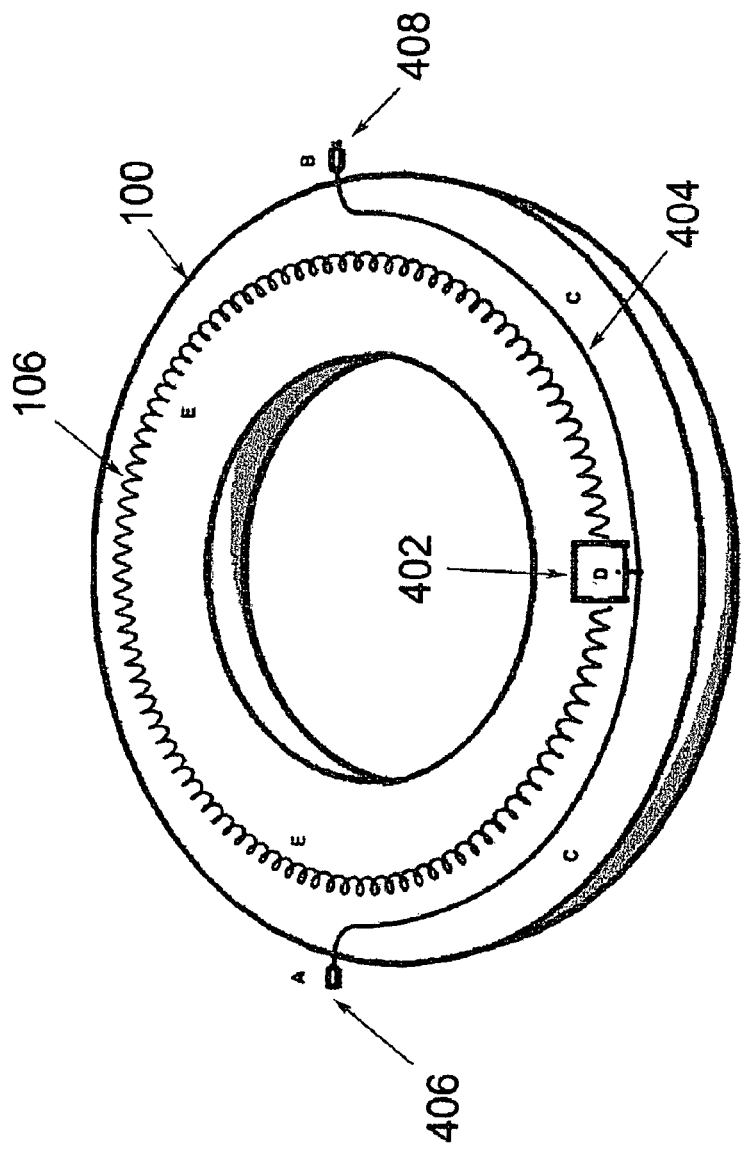
FIG. 4C is an example wiring diagram for the module of FIG. 1A according to one implementation of the present invention.

FIG. 4C is an example wiring diagram for the module 100 of FIGS. 1A and 1B according to one implementation of the present invention. As depicted, the module 100 comprises the coil 106, though other components of FIG. 1B are not illustrated for simplicity. The coil 106 is coupled to a voltage rectifier 402, depicted as a box in FIG. 4C. The rectifier 402 is coupled to the voltage lines 404 which comprise first and second plugs 406, 408. The plugs may be used to connect the voltage lines 404 to adjacent modules within an array or to an output of the array that may go to a storage unit, a power transmission system, a component to utilize the electricity generated or another component that may store, use or transmit the electrical power generated within the modules 100.

In the case of FIG. 4C, the first and second plugs 406, 408 are at opposite ends of the module 100 to allow for increased flexibility in connecting modules together within an array. In alternative embodiments, the plugs may be located in different positions within the module 100 and/or there may be only one or more than two plugs to connect to other modules 100.

As described within FIGS. 1A and 1B, the module 100 comprises a single circular tube 104 wrapped with a coil 106 integrated within a buoyancy ring 102. This design allows for electrical power generation from the movement of one or more magnet elements 110 through the tube 104. In alternative embodiments, in order to increase the electricity generated, a plurality of tubes wrapped with coils may be implemented within a single buoyancy ring.

Figure 5A:
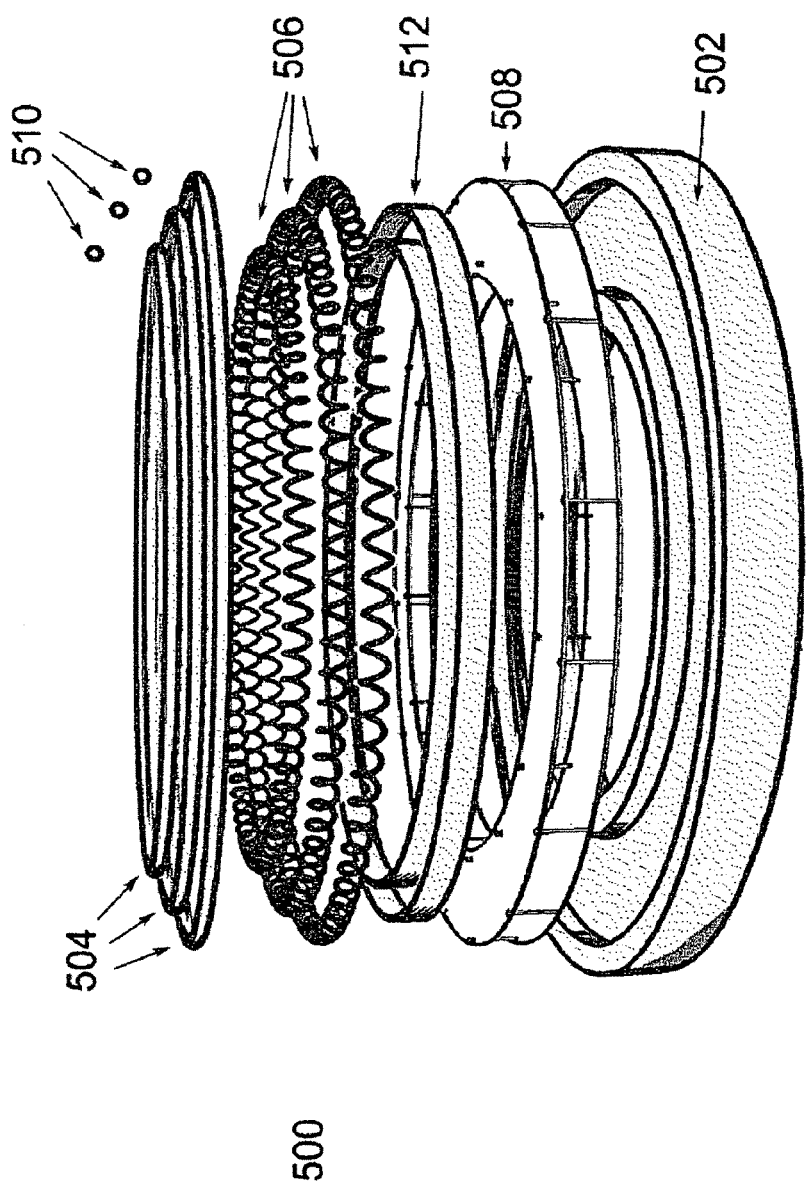
FIG. 5A is a breakout view of a module for generating electricity according to an alternative embodiment of the present invention in which a series of inset coils are implemented.

FIG. 5A is a breakout view of a module according to an alternative embodiment of the present invention in which a series of inset coils are implemented. In this sample implementation, a module 500 comprises a plurality of tubes 504a, 504b, 504c that are each wrapped by a respective coil 506a, 506b, 506c and are integrated within buoyancy ring

502. The tubes 504a, 504b, 504c form circles of different diameters such that they form three inset tubes, the smallest tube 504a when wrapped by coil 506a fitting within the medium sized tube 504b and the medium sized tube 504b when wrapped by coil 506b fitting within the largest tube 504c. The different tubes wrapped by coils may be isolated physically and electrically by electromagnetic shielding materials 512, though other barriers may be used, made of various materials.

The module 500 of FIG. 5A further comprises a plurality of magnet elements 510a, 510b, 510c, each of which are positioned within a corresponding one of the tubes 504a, 504b, 504c and are free to move through their corresponding tube and therefore through the corresponding coil. Similar to previously described, movement of the magnet elements 510a, 510b, 510c through their tubes may be caused by external changes in the displacement of the module 500, for example from angular displacement due to waves on the surface of a body of water. As the magnet elements 510a, 510b, 510c move through their respective tubes 504a, 504b, 504c and therefore through their respective coils 506a, 506b, 506c, voltage is generated on their coils through electromagnetic induction. The three coils may each be coupled to a separate voltage rectifier with their combined DC current being output to a common voltage line, similar to the electrical circuit of FIG. 4B. In other embodiments, the voltages on the coils 406a, 406b, 406c may be combined in other manners.

FIG. 5B is a breakout view of a module according to an alternative embodiment of the present invention in which a series of vertically displaced coils are implemented. In this implementation, a module 520 comprises a plurality of tubes 524a, 524b, 524c that are each wrapped by a respective coil 526a, 526b, 526c and are integrated within buoyancy ring 522. The tubes 524a, 524b, 524c each form a circle of the same diameter but are vertically displaced from one another within the buoyancy ring 522. The different tubes wrapped by coils may be isolated physically and electrically by electromagnetic shielding materials 532, though other barriers may be used, made of various materials.

The module 520 of FIG. 5B further comprises a plurality of magnet elements 530a, 530b, 530c, each of which are positioned within a corresponding one of the tubes 524a, 524b, 524c and are free to move through their corresponding tube and therefore through the corresponding coil. Similar to previously described, movement of the magnet elements 530a, 530b, 530c through their tubes may be caused by external changes in the displacement of the module 520, for example from angular displacement due to waves on the surface of a body of water. As the magnet elements 530a, 530b, 530c move through their respective tubes 524a, 524b, 524c and therefore through their respective coils 526a, 526b, 526c, voltage is generated on their coils through electromagnetic induction. The three coils may each be coupled to a separate voltage rectifier with their combined DC current being output to a common voltage line, similar to the electrical circuit of FIG. 4B. In other embodiments, the voltages on the coils 426a, 426b, 426c may be combined in other manners.

There may be various benefits of the single tube implementation of FIGS. 1A and 1B, the inset tube implementation of FIG. 5A and the vertically displaced tube implementation of FIG. 5C. Advantages of the single tube implementation of FIG. 1A include the limited relative cost of materials and manufacturing, as well as the reduced weight. The reduced weight may allow the module 100 to more severely and/or more frequently be angularly displaced by movement on the surface of a body of water and therefore potentially generate more movement of the magnet element 110 within the tube 104 relative to the movement of each of the magnet elements in modules 500,520. The advantage of the inset tube implementation of module 500 and the vertically displaced tube implementation of module 520 is the potential to generate more electricity within the same surface area of water by increasing the number of coils that are generating voltages.

One should understand that the various embodiments described of modules 100, 500, 520 are not meant to limit the scope of the present invention. In particular, in some embodiments, two or more than three tubes with wrapped coils could be implemented inset similar to that depicted in FIG. 5A. Further, two or more than three tubes with wrapped coils could be implemented vertically displaced similar to that depicted in FIG. 5B. Yet further, a combination of the implementations of FIGS. 5A and 5B could be implemented, in which a plurality of tubes with wrapped coils are inset from one another while also additional tubes with wrapped coils are also vertically displaced. Also, it should be understood that although shown as integrated within a single buoyancy ring in FIGS. 5A and 5B, in some embodiments, a plurality of buoyancy rings could be utilized for various buoyancy affects.

Although the magnet elements of FIGS. 1B, 5A and 5B are shown as spherical elements, it should be understood that alternative shapes and designs for the magnet elements may be used in alternative implementations of the present invention. In particular, in some embodiments of the invention, the magnet element's polarization is controlled to increase the voltage generated through electromagnetic induction on the coils that the magnet element is traversing. Magnets passing through coils generate an increased voltage on the coil through electromagnetic induction when the magnet's polarization is perpendicular to the coil's wraps and a decreased voltage as the magnet's polarization increasingly becomes parallel to the coil's wraps. Using a spherical magnet element as described with reference to FIGS. 1B, 5A and 5B may be useful to keep the module simple and to decrease friction between the magnet element and its tube. A spherical magnet will not ensure that the polarization of the magnet is perpendicular to the coil, hence potentially not optimizing the voltage generated on the coil while the magnet element moves through the tube.

Figure 6A:
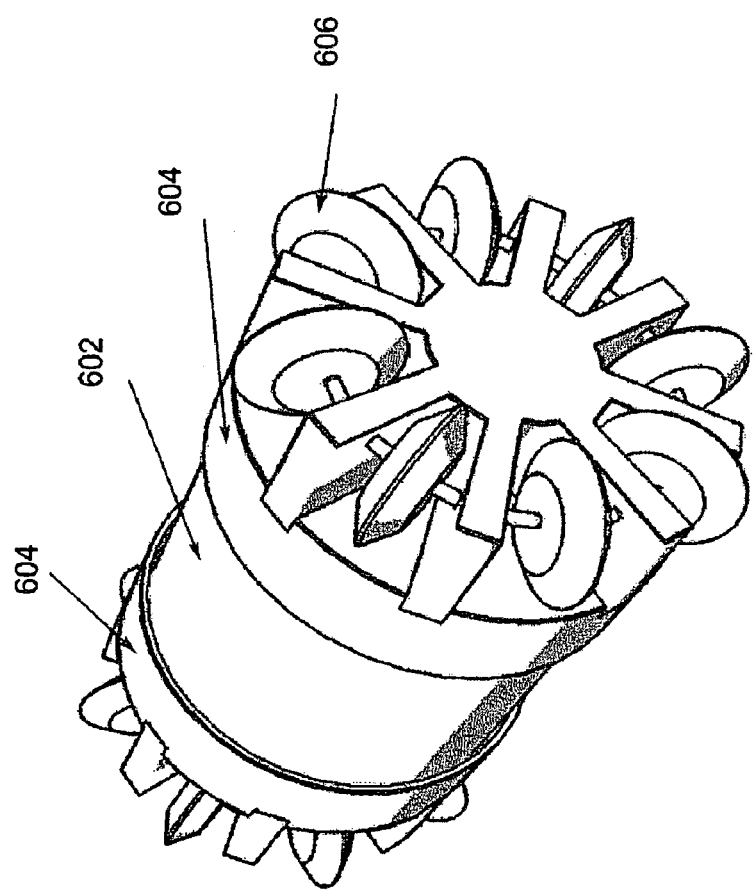
FIG. 6A is a perspective view of a wheeled magnet carriage according to an embodiment of the present invention.
Figure 6B:
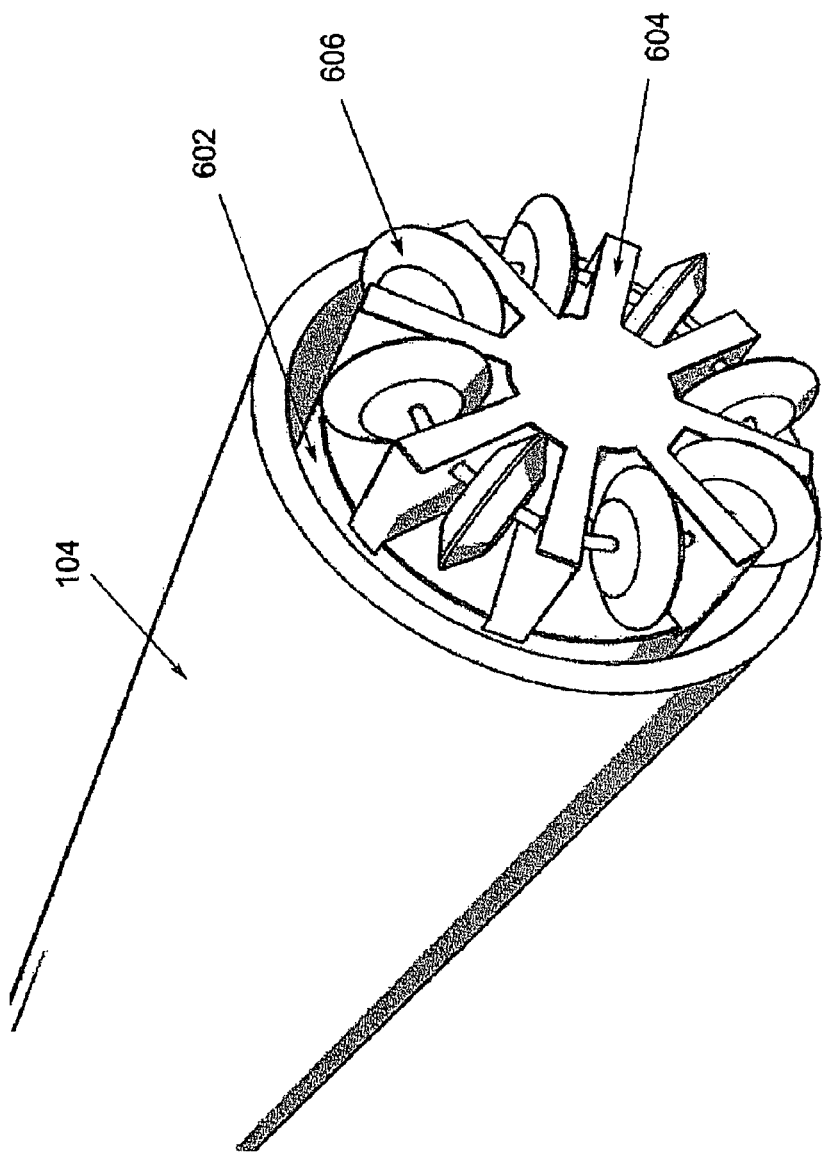
FIGS. 6B, 6C and 6D are a perspective view, a cross-sectioned view and a zoomed-in view respectively of the wheeled magnet carriage of FIG. 6A within a tube.
Figure 6C:
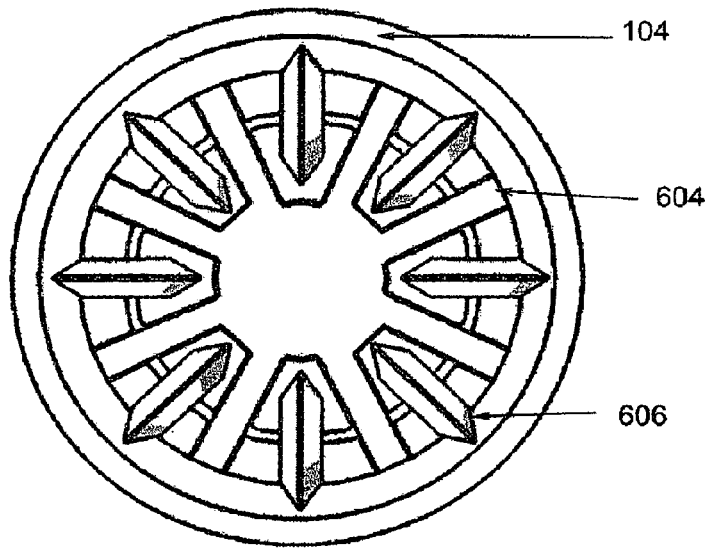
Figure 6D:
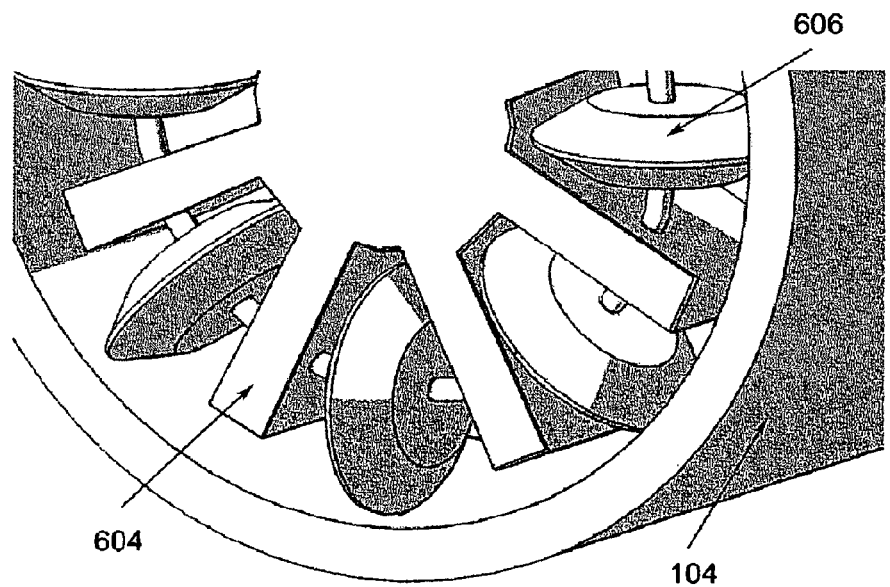

FIG. 6A is a perspective view of a wheeled magnet carriage according to an embodiment of the present invention. FIGS. 6B, 6C and 6D are a perspective view, a cross-sectioned view and a zoomed-in view respectively of the wheeled magnet carriage of FIG. 6A within a tube. In the embodiment of FIGS. 6A-6D, the magnet element comprises a magnet barrel 602 in the shape of a cylinder which may comprise a series of disk magnets with a cap 604 on each end. The caps 604 may comprise various different materials, such as plastic. As shown in FIGS. 6A-6D, the caps 604 are integrated with a plurality of rolling wheels 606 that aid in the movement of the wheeled magnet carriage through a tube, such as the tube 104 of FIG. 1B.

The barrel 602 comprises one or more magnets that have a north-south polarization along the length of its cylinder such that as the barrel passes through a tube wrapped with a coil, the magnet's polarization are perpendicular to the coil's wraps. Unlike a spherical element, the cylindrical shape of the wheeled magnet carriage forces the orientation of the magnet to maximize the voltage generated on the coil as the magnet passes through the tube wrapped with the coil. The wheels 606 allow for a reduced friction as the wheeled magnet carriage traverses the tube as it reduces the contact area between the magnet element and the tube. In alternative embodiments, other solutions may be implemented to reduce friction. In some embodiments, the magnet element may be cylindrical to maintain the orientation of polarization but may not include the wheels 606, hence potentially increasing friction between the magnet element and the tube and reducing the overall movement of the magnet element within the tube.

Figure 7A:
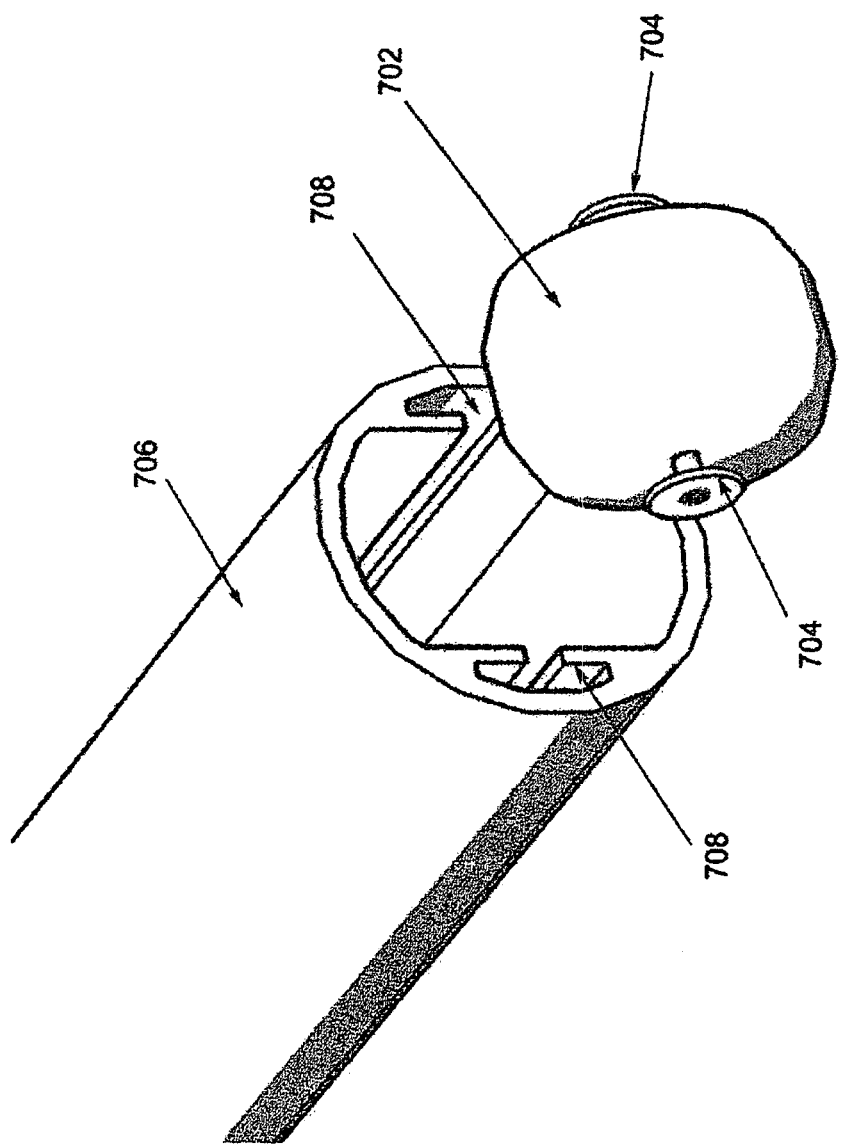
FIGS. 7A and 7B are a perspective view and a cross-sectioned view respectively of a magnetic element with guide elements within a tube with corresponding guide grooves according to an embodiment of the present invention.
Figure 7B:
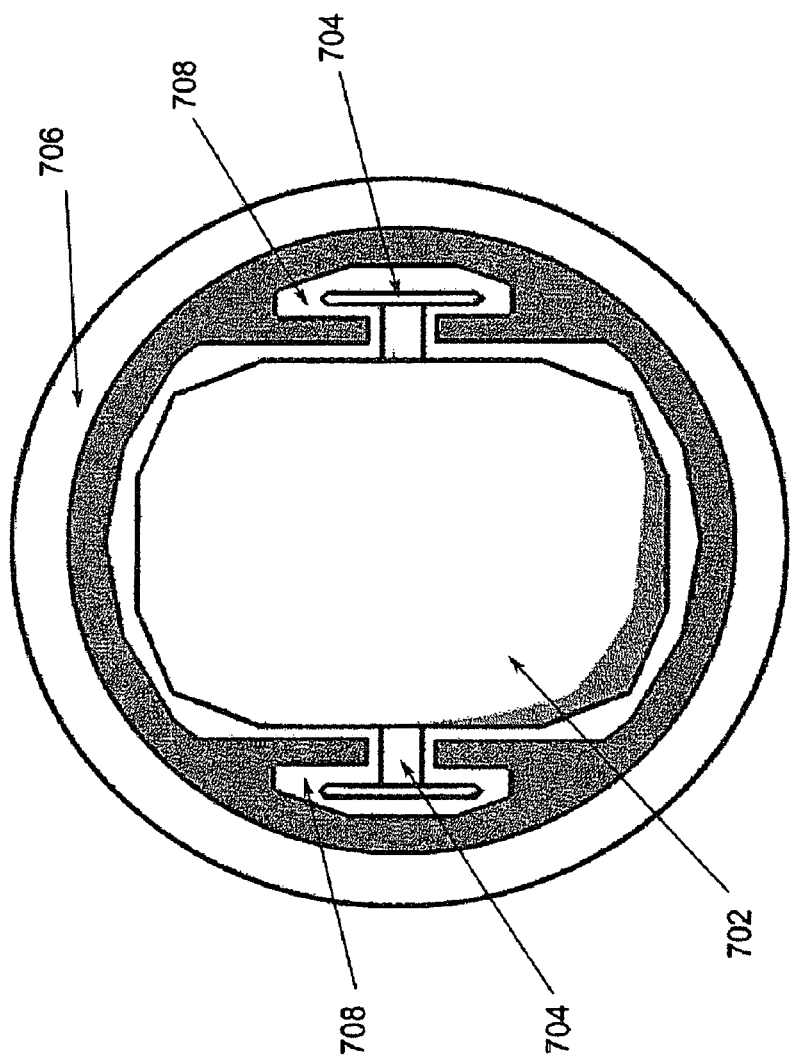

FIGS. 7A and 7B are a perspective view and a cross-sectioned view respectively of a magnetic element with guide elements according to an embodiment of the present invention. In this implementation, the magnet element comprises a magnet core 702 that may take on various shapes, shown as a relatively spherical element in FIGS. 7A and 7B that may comprise a single element or plurality of disks, and includes guide elements 704. A tube 706, in this implementation, may replace the tube 104 of FIG. 1B and be wrapped with the coil 106. The tube 706 comprises guide grooves 708 that allows for the guide elements 704 to slide while forcing the magnet core 702 to remain with its polarization perpendicular to the coil wraps around the tube 706. In FIGS. 7A and 7B, the magnet element comprises two guide elements, though it should be understood that one or more than two may be utilized. Further, other guidance mechanisms could be used to maintain the polarization of the magnet element perpendicular to the coil wraps.

Figure 8A:
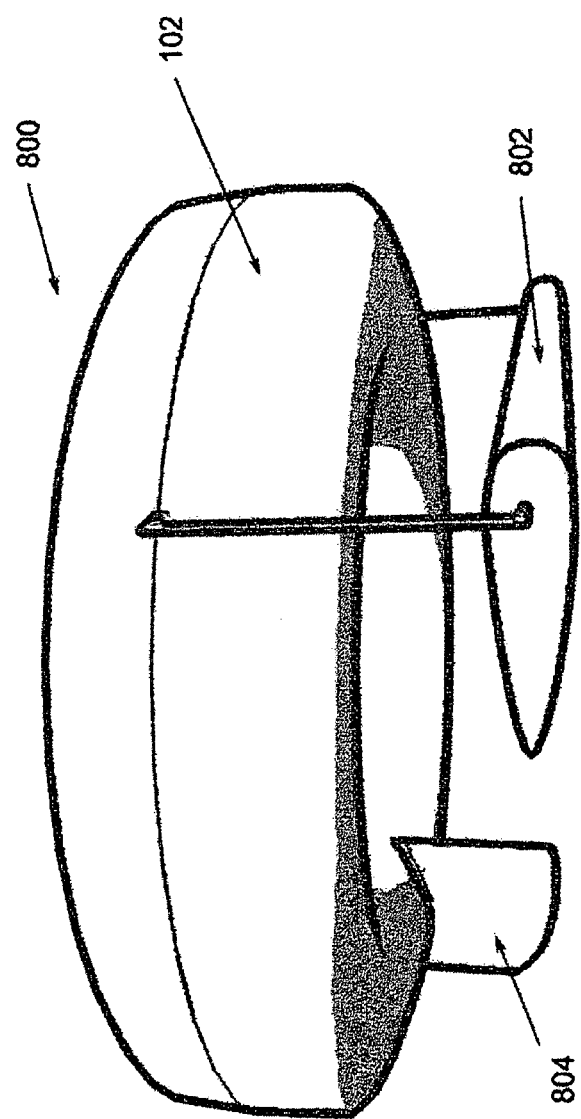
FIGS. 8A, 8B and 8C are a perspective view, a side view and a bottom view respectively of a module that may be used in a river according to an alternative embodiment of the present invention.
Figure 8B:
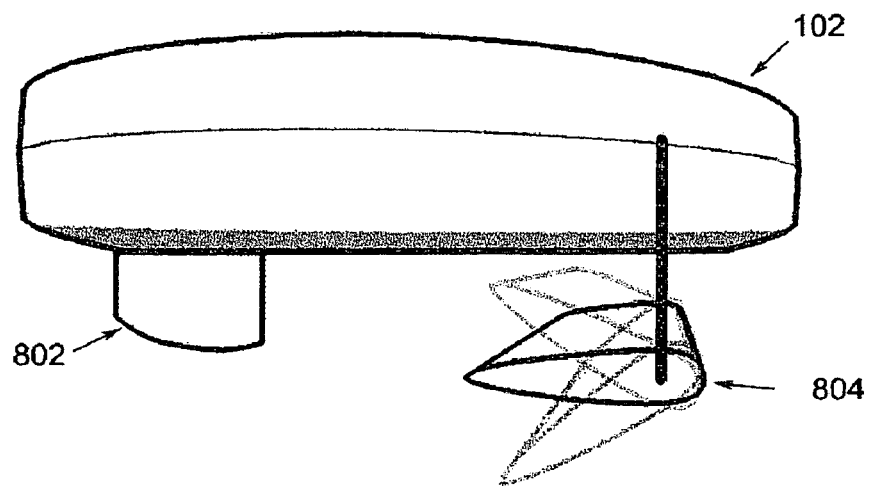
Figure 8C:
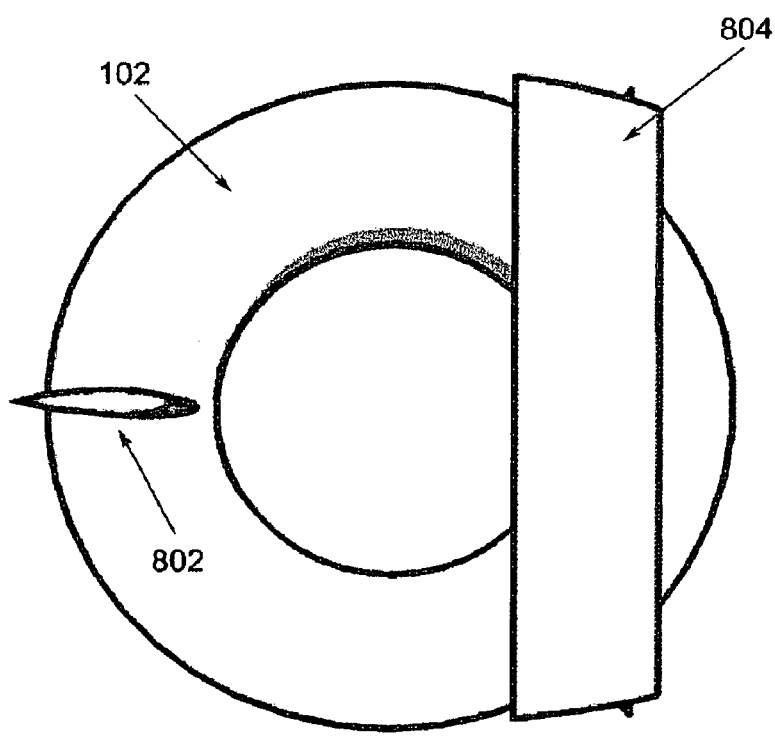

FIGS. 8A, 8B and 8C are a perspective view, a side view and a bottom view respectively of a module according to an alternative embodiment of the present invention that may be used in a river or another body of water with a current. As shown, a module 800 may be very similar to the module 100 of FIG. 1B or any one of the other modules 500, 520, with a buoyancy ring 102 encasing at least one circular tube with a coil. The module 800 may comprise a baffle wing 802 hinged below the buoyancy ring 102 and a stabilizing fin 804. The baffle wing could cause the module 800 to be pushed out of its horizontal plane, such as downward below the surface of the water, with an oncoming current in a river and the buoyancy ring 102 could be used to subsequently cause the module 800 to rise back to the surface of the water and attempt to move the module back to its horizontal plane. This movement of the module 800 up and down would result in angular displacement of the tube within the module and therefore movement of the magnet element through the tube and generation of voltage on the coil wrapped around the tube through which the magnet element moves. The stabilizing fin 804 can aid in keeping the module 800 pointed in the correct direction and stable.

In some embodiments, various other designs could be employed to have current within a river directly or indirectly cause angular displacements of a module similar to that of FIGS. 8A-8C. For instance, in some embodiments, a plurality of baffle wings could be employed or there may be no stabilizing fin or a plurality of stabilizing fins. Further, a baffle wing could be coupled to a different location of the module 800 in addition to or instead of the baffle wing 802 coupled to the bottom of the module 800. For instance, a baffle wing may be coupled to the side or top of the module 800 and may be operable to move the module 800 out of its horizontal plane in a different manner in response to the current of the river. Similar to the array described with reference to FIGS. 3A-3C, the module 800 may be implemented within an array configuration. In this case, all of the modules 800 may include elements such as baffle wings and stabilizing fins or only a subset of the modules may include such elements and adjacent modules may be affected by each other's displacements.

Although depicted in the sample implementations as a circular tube, it should be understood that in some embodiments of the present invention, the tube could be in a different shape such as a straight tube. In this case, the coil would surround the straight tube and the magnet would move only back and forth within the tube. Similar to the embodiments described above, a buoyancy element encasing the tube and coil may be displaced angularly due to waves or other disturbances in the surface of the water and the magnet element would move within the tube in response. The movement of the magnet element through the coil that occurs would cause voltage to be generated on the coil through electromagnetic induction. The movement of the magnet element would not likely be as significant as in the case of a circular tube since momentum would not be able to continue the movement significantly and therefore the generation of electricity would be reduced.

There are numerous advantages of the module according to the present invention compared to other solutions that attempt to generate electricity from ocean waves or other movement of fluids. In particular, implementations of the present invention can have relatively low capital costs and low maintenance costs while directly converting energy from fluid motion (i.e. waves) to electricity. The low capital costs can result from the simple design with few components and the scalable architecture. The low maintenance costs can result from the few moving parts and the high corrosion resistance that can be built into the modules through the use of a sealed housing. Further, the module of the present invention can be built to tolerate extreme wave conditions due to its compact design and limited mechanical elements.

Although various embodiments of the present invention have been described and illustrated, it will be apparent to those skilled in the art that numerous modifications and variations can be made without departing from the scope of the invention, which is defined in the appended claims.

What is claimed is:

1. An apparatus for generating electricity comprising:
a housing operable to float in a fluid and to be angularly displaced in response to movement of the fluid;
first and second tubes within the housing, the first and second tubes formed into first and second circles respectively, wherein the first circle has a first diameter and the second circle has a second diameter that is smaller than the first diameter; and wherein the second circle formed by the second tube is inset within a center open portion of the first circle formed by the first tube;
a first electrically conductive coil comprising a plurality of wraps surrounding at least a portion of the first tube and a second electrically conductive coil comprising a plurality of wraps surrounding at least a portion of the second tube; and
first and second magnet elements operable to move clockwise or counter-clockwise through the first circle formed by the first tube and the second circle formed by the second tube respectively in response to the housing being angularly displaced;
whereby movement of the first and second magnet elements within the first and second circles respectively generates a voltage on the first and second coils respectively through electromagnetic induction.

2. An apparatus according to claim 1, wherein the first tube and the first coil are isolated from the second tube and the second coil using electromagnetic shielding material.

3. An apparatus according to claim 1 further comprising first and second voltage rectifiers coupled to the first and second coils respectively, the voltage rectifiers operable to rectify the voltage on the first and second coils and output a substantially DC current.

4. An apparatus according to claim 1, wherein the first and second magnet elements comprise first and second cylindrical magnets respectively; wherein the first cylindrical magnet is operable to move within the first circle formed by the first tube while maintaining polarization of the first cylindrical magnet element substantially perpendicular to the wraps of the first coil and the second cylindrical magnet is operable to move within the second circle formed by the second tube while maintaining polarization of the second cylindrical magnet element substantially perpendicular to the wraps of the second coil.

5. An apparatus according to claim 1, wherein the first and second magnet elements each comprise a magnet core and one or more guide elements and the first and second tubes each comprise guide grooves corresponding to the guide elements that enable the respective magnet core to move within the respective tube while maintaining polarization of the respective magnet core substantially perpendicular to the wraps of the respective coil.

6. A system comprising a plurality of apparatuses according to claim 1, wherein the apparatuses are integrated together within an array, each of the apparatuses operable to move independently in response to movement of the fluid; whereby, within each apparatus, movement of the magnet element within the corresponding tube in response to movement of the fluid generates a voltage on the corresponding coil through electromagnetic induction.

7. A system according to claim 6, wherein each of the apparatuses further comprises a voltage rectifier coupled to its corresponding coil, each of the voltage rectifiers operable to rectify the voltage on its corresponding coil and output a substantially DC current.

8. A system according to claim 7, wherein the output from the voltage rectifiers within the plurality of apparatuses are coupled together.

9. An apparatus according to claim 1, wherein the first circle formed by the first tube and the second circle formed by the second tube are in a similar horizontal orientation within the housing.

10. An apparatus according to claim 1 further comprising a baffle wing hinged below the housing and spaced away from the housing; wherein the fluid is a body of water with a current; wherein the baffle wing is operable to pull the housing out of its horizontal plane in response to the current of the body of water and angularly displace the housing.

11. An apparatus for generating electricity comprising:
a housing operable to float in a fluid and to be angularly displaced in response to movement of the fluid;
first and second tubes within the housing, the first and second tubes formed into first and second circles respectively, wherein the second circle formed by the second tube is vertically displaced within the housing from the first circle formed by the first tube and wherein the first circle has a first diameter and the second circle has a second diameter that is substantially similar to the first diameter;
a first electrically conductive coil comprising a plurality of wraps surrounding at least a portion of the first tube and a second electrically conductive coil comprising a plurality of wraps surrounding at least a portion of the second tube; and
first and second magnet elements operable to move clockwise or counter-clockwise through the first circle formed by the first tube and the second circle formed by the second tube respectively in response to the housing being angularly displaced;
whereby movement of the first and second magnet elements within the first and second circles respectively generates a voltage on the first and second coils respectively through electromagnetic induction.

12. An apparatus according to claim 11, wherein the first tube and the first coil are isolated from the second tube and the second coil using electromagnetic shielding material.

13. An apparatus according to claim 11 further comprising first and second voltage rectifiers coupled to the first and second coils respectively, the voltage rectifiers operable to rectify the voltage on the first and second coils and output a substantially DC current.

14. An apparatus according to claim 11, wherein the first and second magnet elements comprise first and second cylindrical magnets respectively; wherein the first cylindrical magnet is operable to move within the first circle formed by the first tube while maintaining polarization of the first cylindrical magnet element substantially perpendicular to the wraps of the first coil and the second cylindrical magnet is operable to move within the second circle formed by the second tube while maintaining polarization of the second cylindrical magnet element substantially perpendicular to the wraps of the second coil.

15. An apparatus according to claim 11, wherein the first and second magnet elements each comprise a magnet core and one or more guide elements and the first and second tubes each comprise guide grooves corresponding to the guide elements that enable the respective magnet core to move within the respective tube while maintaining polarization of the respective magnet core substantially perpendicular to the wraps of the respective coil.

16. An apparatus according to claim 11, wherein the first circle formed by the first tube and the second circle formed by the second tube are substantially parallel to each other.

17. An apparatus according to claim 11 further comprising a baffle wing hinged below the housing and spaced away from the housing; wherein the fluid is a body of water with a current; wherein the baffle wing is operable to pull the housing out of its horizontal plane in response to the current of the body of water and angularly displace the housing.

18. A system comprising a plurality of apparatuses according to claim 11, wherein the apparatuses are integrated together within an array, each of the apparatuses operable to move independently in response to movement of the fluid; whereby, within each apparatus, movement of the magnet element within the corresponding tube in response to movement of the fluid generates a voltage on the corresponding coil through electromagnetic induction.

19. A system according to claim 18, wherein each of the apparatuses further comprises a voltage rectifier coupled to its corresponding coil, each of the voltage rectifiers operable to rectify the voltage on its corresponding coil and output a substantially DC current.

20. A system according to claim 19, wherein the output from the voltage rectifiers within the plurality of apparatuses are coupled together.

* * * * *